United States Patent [19]

Yoshioka

[11] Patent Number: 5,027,198

[45] Date of Patent: Jun. 25, 1991

[54] TELECONFERENCE SYSTEM WITH IMAGE DISPLAY AND INPUT MEANS

[75] Inventor: Kazuo Yoshioka, Nagasaki, Japan

[73] Assignee: Mitsubishi Denki Kabushiki Kaisha, Tokyo, Japan

[21] Appl. No.: 268,719

[22] Filed: Nov. 9, 1988

[30] Foreign Application Priority Data

Nov. 10, 1987 [JP] Japan ................................. 62-284036

[51] Int. Cl.⁵ ........................ G08C 21/00; H04N 7/15
[52] U.S. Cl. ........................................ 358/85; 379/53; 178/18
[58] Field of Search ............... 379/96, 98, 53; 358/85; 178/18

[56] References Cited

U.S. PATENT DOCUMENTS

| | | | |
|---|---|---|---|
| 4,293,734 | 10/1981 | Pepper, Jr. ............................ | 178/18 |
| 4,564,078 | 1/1986 | Enokido et al. ....................... | 178/18 |
| 4,620,062 | 10/1986 | Mizzi et al. ........................... | 178/18 |
| 4,644,101 | 2/1987 | Jin et al. ................................ | 178/18 |
| 4,794,634 | 12/1988 | Tonhata et al. ....................... | 379/96 |

FOREIGN PATENT DOCUMENTS 0066459  4/1986  Japan .................................... 379/96

62-61463  3/1987  Japan .

OTHER PUBLICATIONS

Nippon Telegraph and Telephone Public Corporation (Japan), "Telewriting Terminal 'Sketchphone'," E.C.L. Technical Publication No. 282, ©1983.

Primary Examiner—Jin F. Ng
Assistant Examiner—Stella L. Woo
Attorney, Agent, or Firm—Burns, Doane, Swecker & Mathis

[57] ABSTRACT

The invention provides a novel teleconference system which saves space being occupied by individual terminal equipment by superimposing a transparent image input surface of an image input device over a display screen of an image display device, and is provided with a central processing unit which causes the images being received by image input device of an individual terminal equipment to be displayed by image display devices of other individual terminal equipment, furthermore, allows operators to easily correct and add images shown on a display screen by making an input position of an image input surface coincide to a display position of an image display screen.

3 Claims, 4 Drawing Sheets

TELECONFERENCE SYSTEM WITH IMAGE DISPLAY AND INPUT MEANS

BACKGROUND OF THE INVENTION

1. Field of the Invention

The present invention relates to a teleconference system which allows each attendant create information images using an individually allocated terminal equipment and to transmit them to other attendant's individual terminals so that all the attendants can effectively and smoothly proceed with a conference.

2. Description of the Prior Art

There has been developed the so-called teleconference system which allows attendants to proceed with a conference using a specific communication network for connecting respective remote places.

FIG. 1 is a block diagram showing an arrangement of a teleconference system as disclosed in Japanese Patent Application Laid-Open No. 62-61463 (1987).

The above teleconference system is provided with a large display unit 1 to which a plurality of individual terminal equipments 11 are connected for each attendant. Each individual terminal equipment 11 comprises a compact electronic blackboard 2 which allows each attendant to input individual views, a video selector 3 which is connected to the compact electronic blackboard 2, a compact display unit 6 which displays individual views of each attendant, and a hard copier 7 which reproduces hard copies of images displayed on the large display 1 or the compact display 6.

The entire teleconference system is composed of a video memory 5 used for the compact display unit 6 of the individual terminal equipment 11, a video memory 4 used for the large display unit 1, transmitting/receiving units 8 and 9 for communications between other systems of this kind.

Next, operation of the above conventional teleconference system is described below.

In case of expressing views, each attendant draws figures and sentences on the compact electronic blackboard 2 of the individual terminal equipment 11 using a felt-tip pen and the like. Then, each attendant operates the compact electronic blackboard 2 to convert the written content into electrical signals and selectively operates the video selector 3 to display the written content on the large display unit 1 or the respective compact display unit 6. In addition, information is transmitted and received between another of this kind of teleconference system through the transmitting/receiving unit 8 and 9, and thus, a conference is possible to be held between remote places.

In the conventional teleconference system, there have been difficulties that it occupies wide space in a conference room because of discrete hardware structures of the individual compact electronic blackboard 2 for receiving data and the individual compact display unit 6 for displaying data. This incurs much inconvenience at the conference for using a limited space effectively.

Furthermore, if an attendant expresses additional views or corrects views written by another attendant on the compact electronic blackboard 2, he needs to leave his seat to write his views or correct the content of the preceding views on the compact electronic blackboard 2. Although either of these difficulties can easily be overcome in one conference room, it is totally impossible for the conventional teleconference system to allow another attendant to write additional views or correct the content of the preceding figures or sentences on the compact electronic blackboard when a joint conference is held through a communication network being connected between remote places.

SUMMARY OF THE INVENTION

The primary object of the invention is to overcome those problems mentioned above by providing a novel teleconference system which securely saves space in a conference room by integrating individual input means with individual display means.

Secondary object of the invention is to provide a novel teleconference system which allows each attendant to easily supplement or correct the content of the preceding figures or sentences inputted by other attendants using individual input means.

The invention provides a novel teleconference system which saves space by occupying an individual terminal equipment which superimposes a transparent image input surface of image input means over an image display screen of image display means, and is provided with a central processing unit which receives image data inputted by image input means of an individual terminal equipment and transmits the image data to image display means of other individual terminal equipment, furthermore, allows operators of the individual terminals to easily add and/or correct the images by image input means.

The above and further objects and features of the invention will more fully be apparent from the following detailed description with accompanying drawings.

DESCRIPTION OF THE PREFERRED EMBODIMENT

Referring now to the accompanying drawings, a preferred embodiment of the teleconference system related to the invention is described below.

Figure 2:
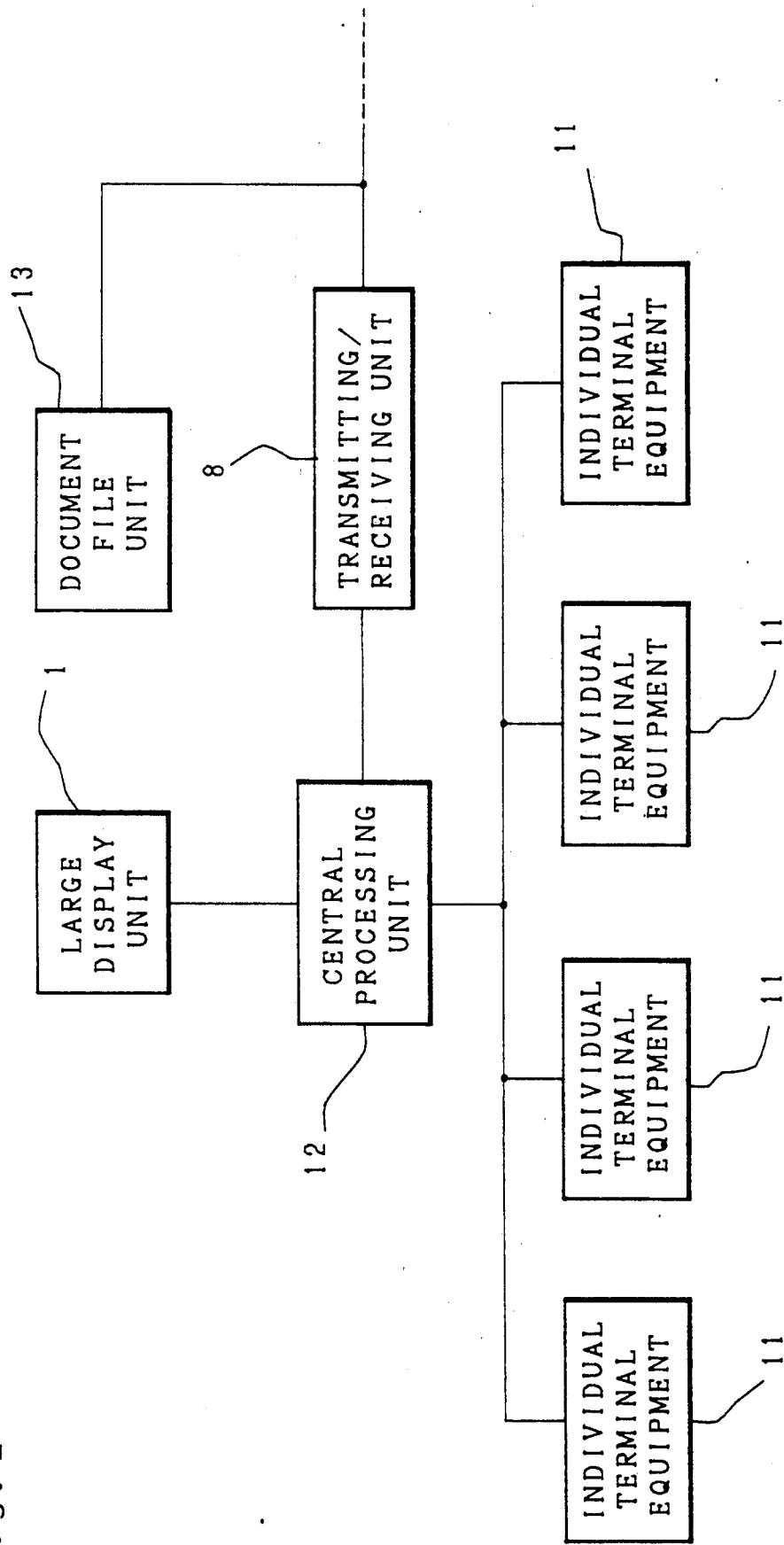
FIG. 2 is a simplified block diagram showing one example of the teleconference system related to the invention.
Figure 3:
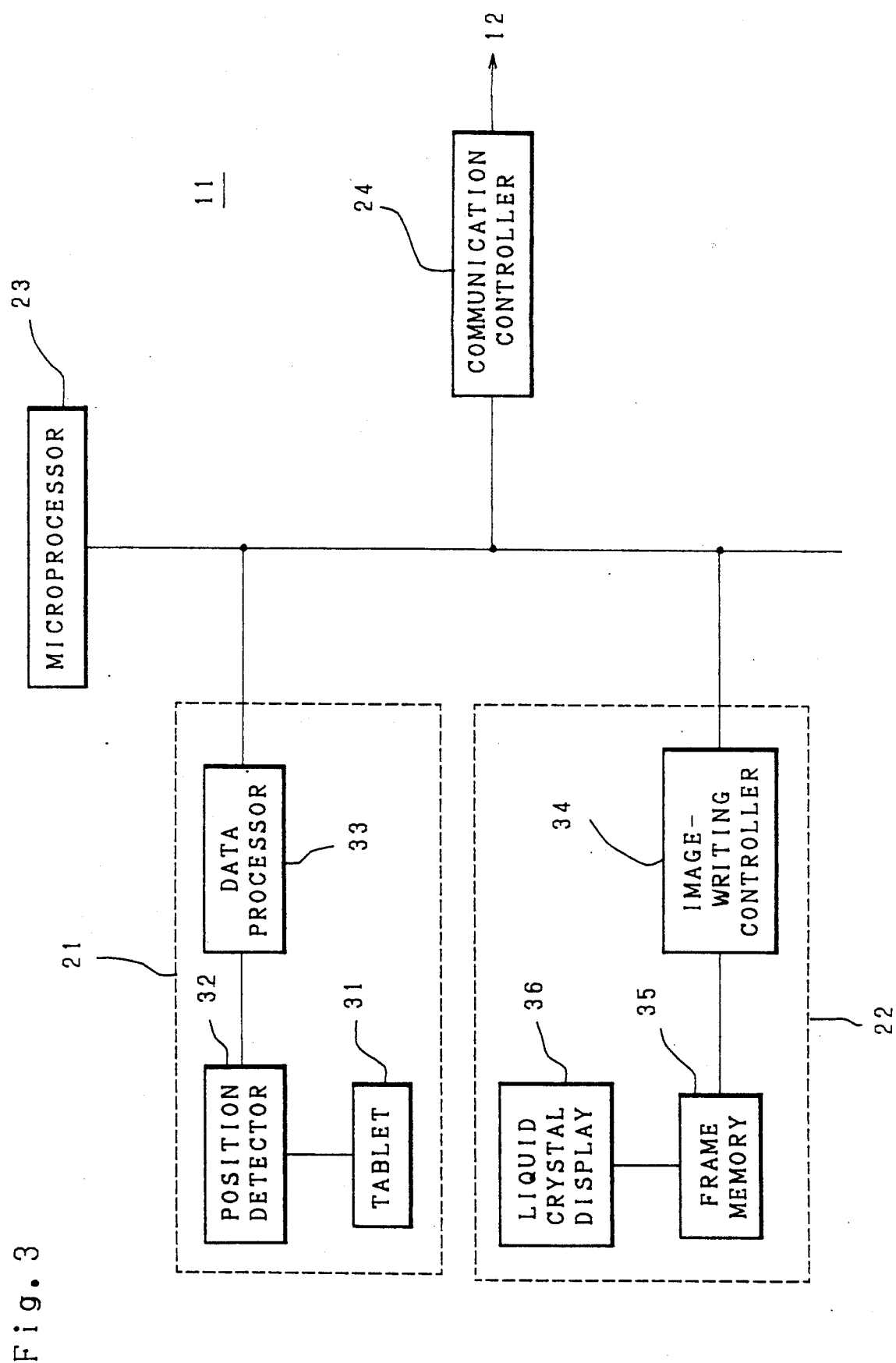
FIG. 3 is a detailed block diagram showing an example of an individual terminal equipment related to the invention.

FIG. 2 is the simplified block diagram showing an arrangement of the teleconference system related to the invention. FIG. 3 is the detailed block diagram showing an example of the individual terminal equipment 11 related to the invention.

The teleconference system related to the invention is provided with a plurality of individual terminal equipment 11, wherein individual input means and individual display means are arranged as described later.

A central processing unit 12 controls operation of each terminal equipment 11 and a large display 1. The central processing unit 12 for controlling each individual terminal equipment and the large display unit 1 is provided with a transmitting/receiving unit 8 for communicating with other teleconference systems.

The teleconference system is also provided with a document file unit 13 which is connected to the central processing unit 12 via the transmitting/receiving unit 8.

Each individual terminal equipment 11 is composed of a transparent digitizer unit 21 as individual input means, a liquid crystal display unit 22 as individual display means, a microprocessor 23, and a communication controller 24, respectively.

The transparent digitizer unit 21 is composed of a pressure sensitive transparent tablet 31, a position detector 32, and a data processor 33.

The pressure sensitive transparent tablet 31 is mounted on a display screen of a liquid crystal display 36, which is to be described later, in the liquid crystal display unit 22. When an attendant writes figures or sentences on the pressure sensitive transparent tablet 31 by a finger or a pen-like stick, positions of movement of the finger or the pen-like stick on the pressure sensitive transparent tablet 31 are continuously detected by the position detector 32 and then position-detect signals are converted into digital data by the data processor 33, and the result is transmitted to the microprocessor 23.

In response to the operating mode set up at that point, the microprocessor 23 transmits digital data from the data processor 33 to the central processing unit 12 via the communication controller 24 or to the liquid crystal display unit 22 of the operating individual terminal equipment 11 itself.

Figure 4B:
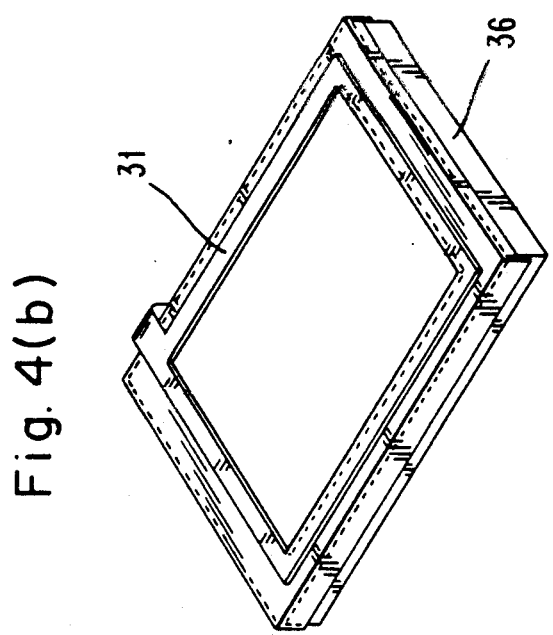
FIG. 4 is a simplified assembling diagram showing an example of an individual terminals related to the invention.
Figure 4A:
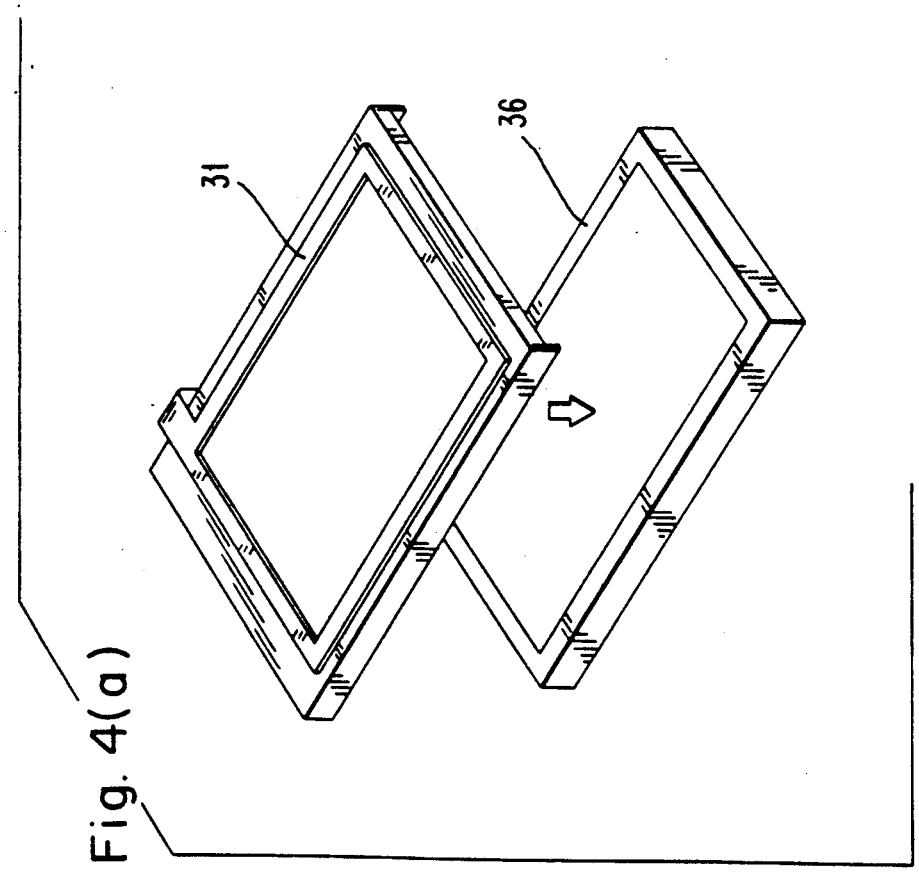

As mentioned above, the pressure sensitive transparent tablet 31 of the transparent digitizer unit 21 is mounted on the display screen of the liquid crystal display unit 22. Referring momentarily to FIG. 4, the transparent tablet 31 is superimposed on the LCD display 36. In accordance with the written data transmitted from the transparent digitizer unit 21 to the liquid crystal display unit 22, images are written in a frame memory 35 by means of an image-writing controller 34. And the image written in the frame memory 35 is displayed on the liquid crystal display 36. When the image is displayed, a position of the image on the liquid crystal display 36 coincides with a position where the image is inputted on the pressure sensitive transparent tablet 31. This permits the image written on the pressure sensitive transparent tablet 31 of the transparent digitizer unit 21 by a finger or a pen-like stick to be displayed at the corresponding position of the liquid crystal display 36 at equivalent scale. In other words, any attendant operating this terminal equipment 11 can manually write images as required. Likewise, erasing operation can be executed by erasing images displayed on the liquid crystal display 36 sequentially on the pressure sensitive transparent tablet 31.

Next, operation of the teleconference system related to the invention is described below.

In case of expressing a view, those who attend at the conference operate individual terminal equipment 11 to read necessary data of documents from the document file unit 13 connected to the central processing unit 12, or prepare the necessary figures or sentences by manually writing or using graphic command means on the pressure sensitive transparent tablet 31 of the individual terminal equipment 11 before displaying the written figures or sentences on the liquid crystal display 36 of the other individual terminals. It is possible to display the image same as on the liquid crystal display 36, on the screen of the large display unit 1 being connected to the central processing unit 12. This image can also be displayed on liquid crystal displays 36 of other individual terminal equipment 11 as required. Thus, any image written on a liquid crystal display by one attendant is also displayed on liquid crystal displays 36 of other individual terminal equipments 11 being operated by other attendants. If any attendant manually writes figures or sentences or erases any part of the content of the displayed image, the written or erased content is transmitted to the central processing unit 12 from the operating individual terminal equipment 11, and then the processed result by the central processing unit 12 is also displayed on the liquid crystal displays 36 of other individual terminal equipments 11. As a result, any attendant at the conference can easily correct the displayed content or add supplementary figures or sentences on the liquid crystal display.

Figure 1:
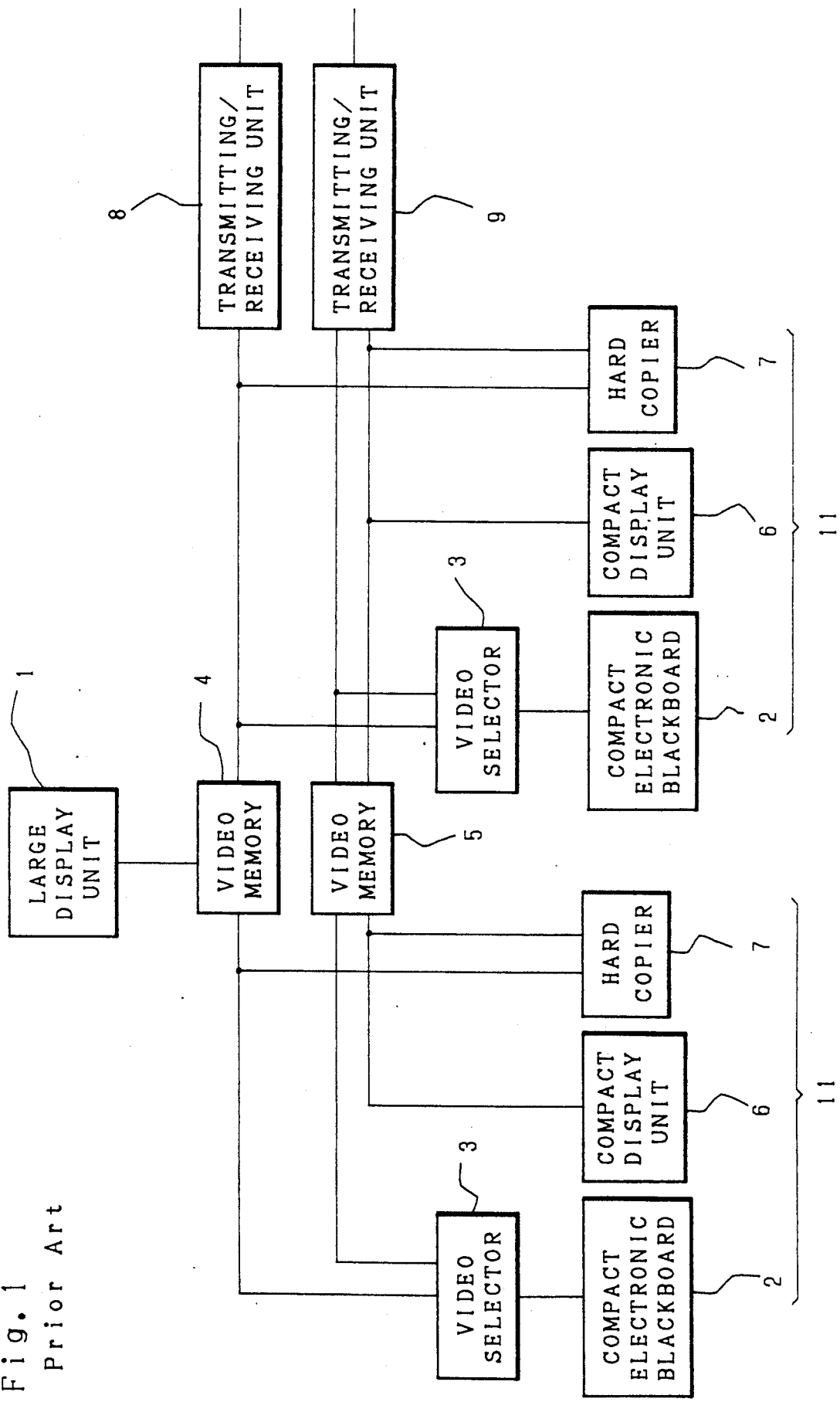
FIG. 1 is a simplified block diagram showing a conventional teleconference system.

As is clear from the foregoing description, according to the teleconference system of the invention, the pressure sensitive transparent tablet 31 in the transparent digitizer unit 21 is superimposed over the display screen of the liquid crystal display 36 in the liquid crystal display unit 22. This permits the transparent digitizer unit as individual image input means and the liquid crystal display unit 36 as individual image display means to be integrated without adversely affecting display performance of the liquid crystal display 36 so as to save space in the conference room. Furthermore, the teleconference system related to the invention allows any attendant to correct images shown on liquid crystal displays of individual terminal equipments connected to each other via the central processing unit 12 by superimposing the pressure sensitive transparent tablet over the display screen of the liquid crystal display 36. As a result, any attendant can easily correct and add the figures or sentences drawn by other attendants on his own display screen even from remote places. Like any conventional teleconference system, the teleconference system related to the invention may also be provided with a hard copier and the like which are not shown in FIGS. 1 and 2.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A conference system comprising a plurality of individual terminals which are provided with individual image input means and individual image display means respectively and connected to each other via communication lines, wherein said image input means of said individual terminals is provided with a transparent image input surface composed of a pressure sensitive transparent tablet for inputting an image drawn thereon;

said image display means of each of said individual terminals, whereupon said image input surface of said image input means is superimposed, is provided with an image display screen whose image display position corresponds to the input position of said image input surface by equivalent scale;

said system further comprising a central processing unit which is connected with said individual terminals via a data transmission line and receives image data inputted by said image input means of said individual terminals and transmits said image data to said image display means of other individual terminals; and a large display unit which is connected with said central processing unit and which displays said image data transmitted from said individual terminals to show said image data to all attendants of said conference.

2. A conference system as set forth in claim 1, wherein said image display screen of said image display means is composed of a liquid crystal display.

3. A conference system as set forth in claim 1, wherein each of said individual terminal equipment is connected to document file units so that image information being read out from said document file is displayed on said image display screen.

* * * * *